J. E. OLLIVIER.
RUNNER CARRIER FOR MOTOR VEHICLES.
APPLICATION FILED SEPT. 5, 1917.
1,346,052.
Patented July 6, 1920.
4 SHEETS—SHEET 2.
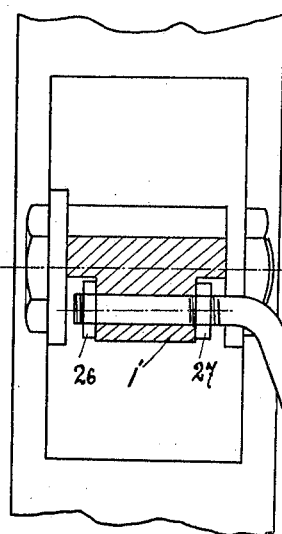
Fig. 2.
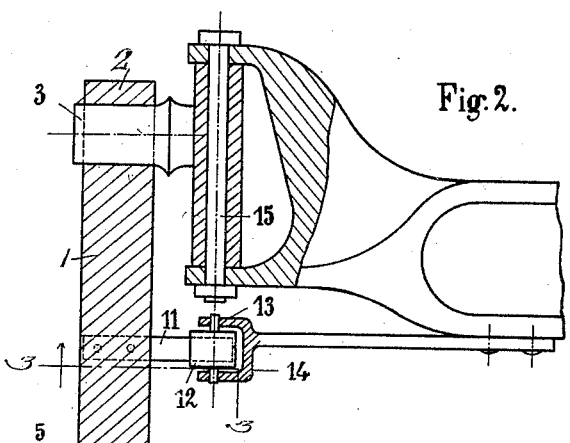
Fig. 3.
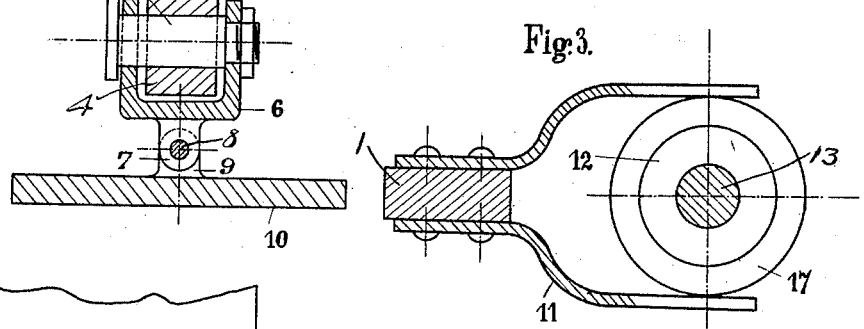
Fig. 6.
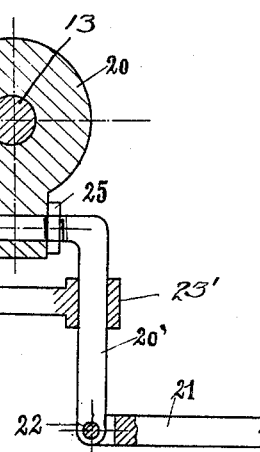
INVENTOR
Jocelyn Emile Ollivier
BY
ATTORNEY

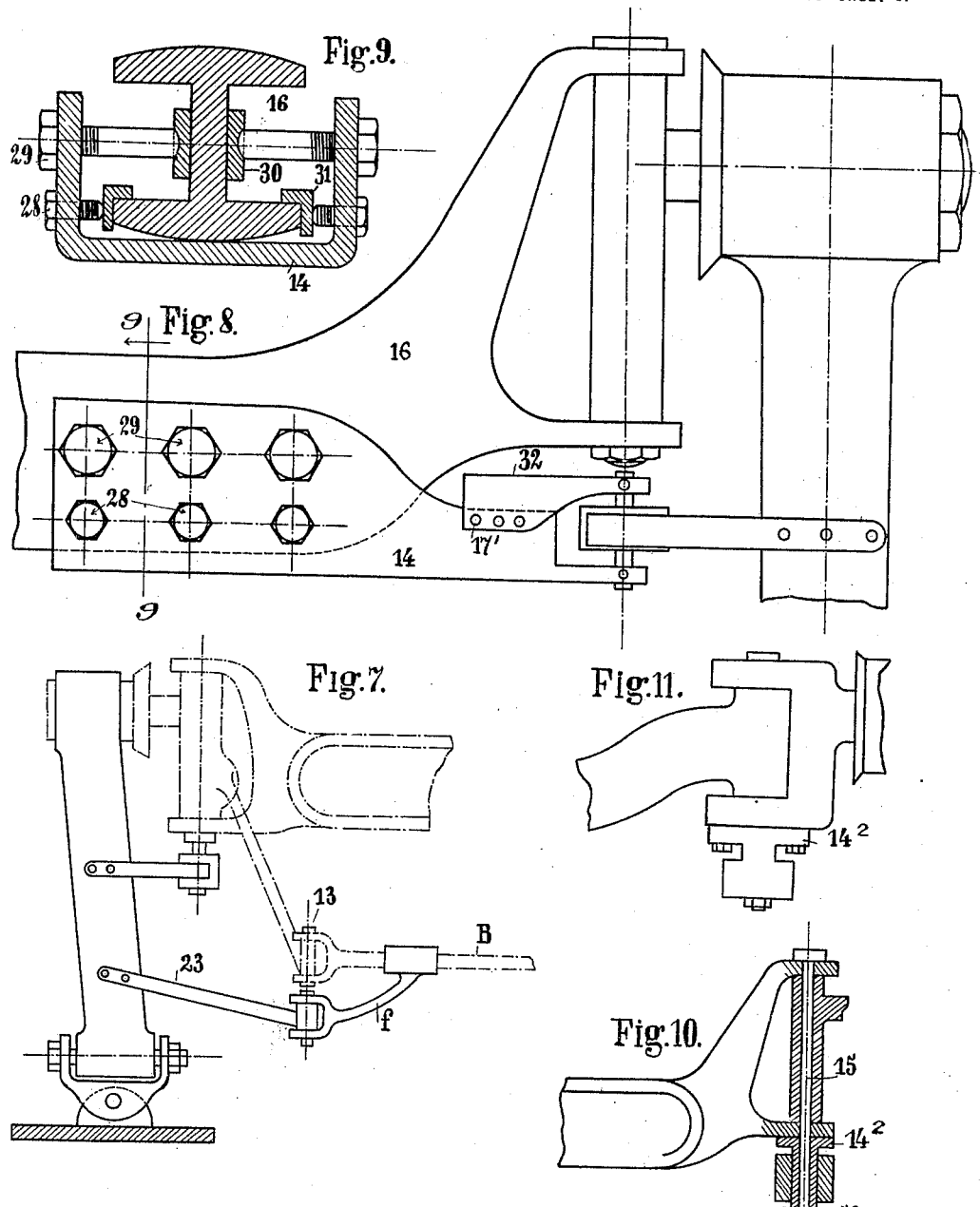

J. E. OLLIVIER.
RUNNER CARRIER FOR MOTOR VEHICLES.
APPLICATION FILED SEPT. 5, 1917.
1,346,052.
Patented July 6, 1920.
4 SHEETS—SHEET 4.
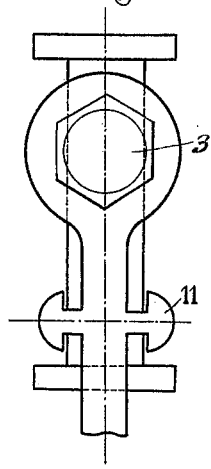
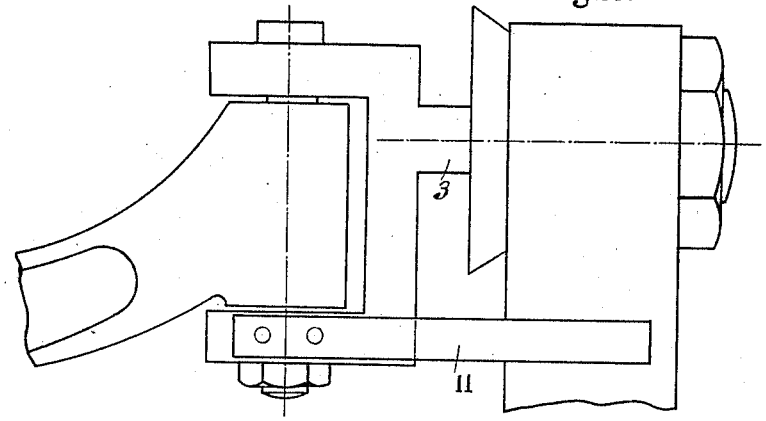
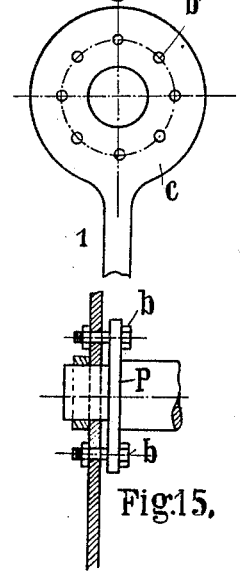
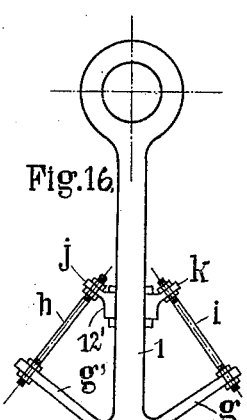
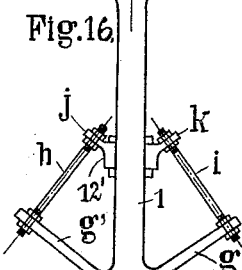
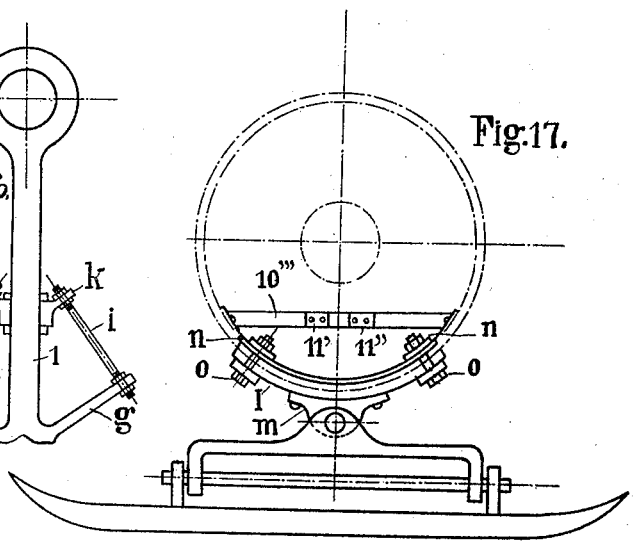
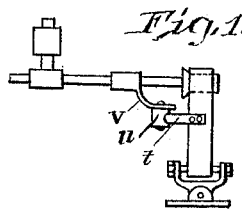
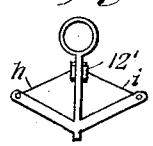
INVENTOR
Jocelyn Emile Ollivier
BY
ATTORNEY

UNITED STATES PATENT OFFICE.

JOCELYN EMILE OLLIVIER, OF ST. GERVAIS-LES-BAINS, FRANCE.

RUNNER-CARRIER FOR MOTOR-VEHICLES.

1,346,052.  Specification of Letters Patent.  Patented July 6, 1920.

Application filed September 5, 1917. Serial No. 189,767.

*To all whom it may concern:*

Be it known that I, JOCELYN EMILE OLLIVIER, citizen of the Republic of France, and resident of St. Gervais-les-Bains, France, (post-office address Villa La Vignette,) have invented a new and useful Runner-Carrier for Motor - Vehicles, which improvements are fully set forth in the following specification.

The present invention relates to an arrangement of runner carrying rods enabling the front wheels of a motor car to be replaced by runners when the car is required to travel over snow or ice.

It consists essentially of a rod which comprises at its upper end an eye that fits over the steering spindle (the wheel being removed) and which, at its lower end, carries a runner, through the medium of two pivots, the first being transverse and the second longitudinal, in order that the runner may be able to follow all the undulations of the ground. Furthermore a stop device prevents the runner-carrying rod from rotating about the spindle and constrains it to remain in a position not far removed from the vertical, at the same time leaving it free to pivot to right and left; and finally an accessory device, (consisting of a jointed coupling device) insures the connection of the runners.

The invention is illustrated by way of example in the accompanying drawing, wherein—

Fig. 2 is a front view thereof, partly in section.

Fig. 3 is an enlarged horizontal section on line 3—3, Fig. 2, but showing a cushion applied to the stop device.

Fig. 4 is a modification or development of the construction represented in Figs. 1 and 2, and shows an auxiliary or secondary coupling device for connecting the runner-carrying rods; said figure being a view in front elevation, but showing the end of the elbow 20' in section.

Fig. 5 is a detail view showing a slight modification of the eye in which said elbow is mounted.

Figure 1:
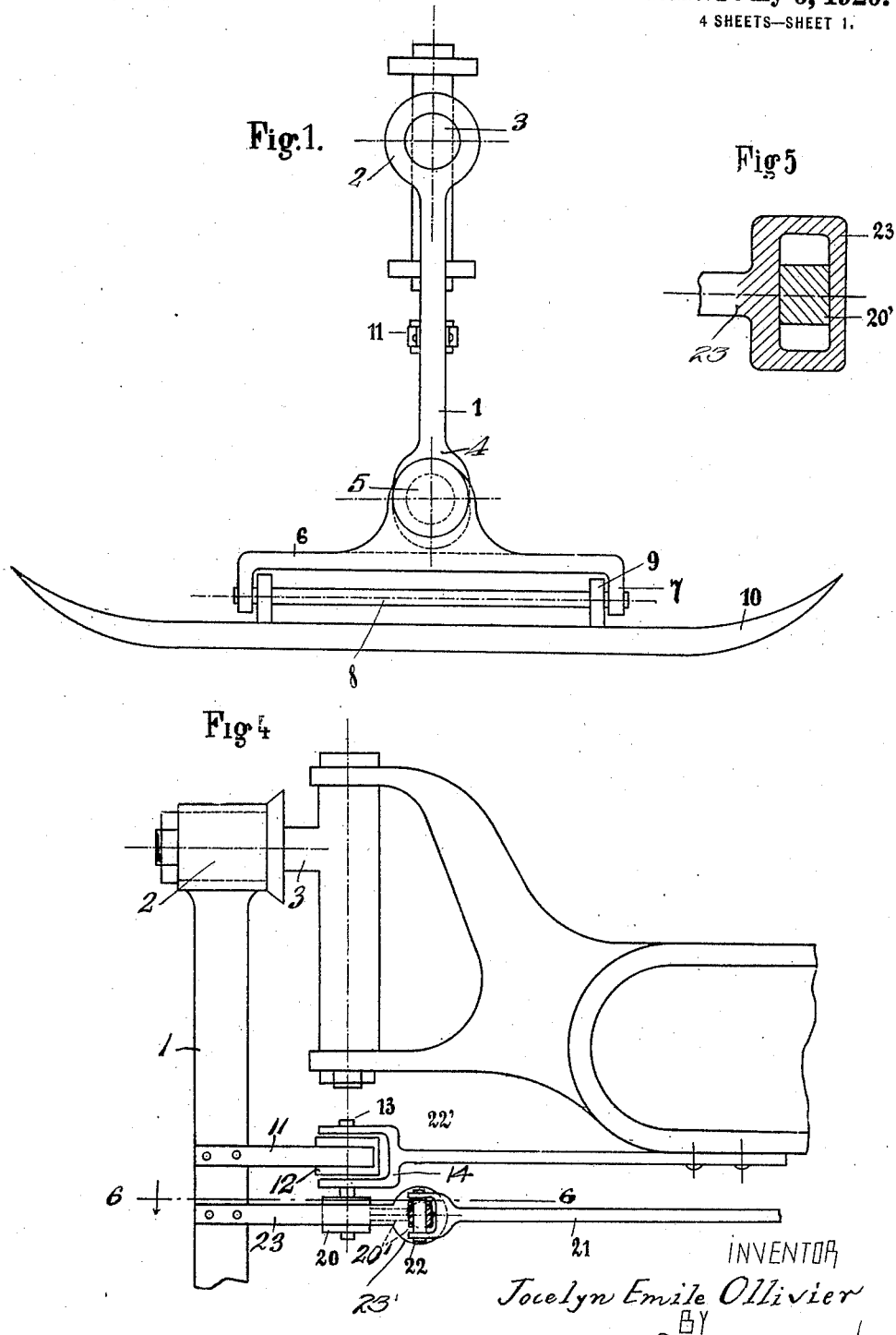
Figure 1 is a side view of the runner-carrying rod.

Fig. 6 is an enlarged horizontal section taken in the plane of line 6—6, Fig. 4, but illustrating a slightly modified mounting for the coupling rod 23 and elbow 20'.

Fig. 7 is a modification of the device illustrated in Fig. 4, in which only one coupling bar is used.

Figs. 8, 9, 10 and 11 relate to constructional details of one of the members of the stop device.

Figs. 12 and 13 refer to simplified constructional forms of the invention.

Fig. 14 refers to a runner-carrying rod designed to replace a dished plate wheel.

Fig. 15 shows the mounting of an ordinary dished plate wheel.

Fig. 16 applies to a modification of the device employed for preventing the runner-carrying rod from rotating.

Fig. 17 shows another form, in which it is the wheel itself, without the tire, that serves as a runner-carrying rod.

Figs. 18 and 19 refer to the application of the device to wheels having a central pivot.

The runner-carrying rod can be fitted to all types of spindles, but it will be particularly advantageous to use it with an arrangement of detachable wheels, which is what has been illustrated in all the above figures.

The runner-carrying rod 1 comprises, at its upper part, an eye 2 which is engaged with the spindle 3 in place of the wheel (Figs. 1 and 2). At its lower part the rod 1 comprises an eye 4, similar to the eye 2. An assembling bolt 5, forming the transverse pivot connects to the rod 1 a yoke 6 which terminates at its extremities in two depending ears 7. A bolt 8 passes through these ears 7 and also through two lugs 9 which are rigidly connected to the runner 10, thus effecting the attachment of the runner to the yoke 6, the bolt 8 playing the part of a longitudinal pivot.

The stop device consists of a pair of jaws 11, which are fixed to the rod 1 and engage between them a wheel 12 as shown in Fig. 3. This wheel is loose on a pin 13, which is fixed to a bracket 14 virtually integral with the axle. The pin 13 is situated in alinement (or very nearly in alinement) with the axis of rotation 15 of the axle journal, the purpose of this arrangement being to prevent the stop device from hampering in any way the pivoting of the axle journal.

In order to prevent shocks to the axle it will be advantageous to interpose a resilient body 17 between the jaws 11 and the wheel 12 (Fig. 3). This resilient body may consist for instance of an annular air cushion, but I do not limit myself to this construction and it might be replaced by any other mechanical or pneumatic means giving the desired flexibility.

It is advisable on account of the lateral forces to which the runners are subjected, to utilize a supplementary coupling device between the two runner-carrying rods. Figs. 4 and 6 show this coupling device; but in Fig. 4, the eye 2 on the runner-carrying rod 1 has a slightly different form from that illustrated in Figs. 1 and 2, and a retaining nut is provided to prevent displacement of said eye from the spindle 3.

According to the construction shown in Figs. 4 and 6, the pin 13 is extended downward, and on its lower portion is mounted a sleeve 20 which can rotate freely about said pin and which has connected to it an elbow 20' one arm thereof (Fig. 6) being parallel to the runner. A coupling bar 21, fixed to the elbow 20' by means of the pivot 22, is also fixed to a similar piece mounted and arranged in the same manner on the righthand side of the axle. A rod 23, securely fixed at its outer end to the runner-carrying rod 1, is provided at its inner end with an eye 23' in which the elbow 20' is slidably engaged and which may be enlarged and disposed vertically, as indicated in Fig. 5, when it is desired to make provision for a vertical movement of said elbow. By virtue of this device, the connection between the runners will be securely maintained but at the same time the runner-carrying rod will be able to oscillate slightly backward and forward, which is rendered possible by the resilient stop device.

The elbow 20' is preferably mounted to have the above-described slight vertical movement in the rod eye 23', and in this way the rod 23 will be able to have a certain amount of vertical play with respect to the said elbow (but no lateral play).

The usual coupling bar of the wheels of the motor car can be removed or retained at will when the other is mounted. In the latter case there will then be two coupling devices operating together and they should be situated exactly over one another, with their pivots in vertical alinement (Fig. 4).

The elbow 20' may be made in one piece with the sleeve 20, as indicated in dotted lines in Fig. 4 or, as indicated in Fig. 6, it may slide in an eye $20^2$ provided on said sleeve (nuts 24 and 25 fixing it in the desired position) remaining at the same time parallel to the runner. The rod 23 may be mounted in the same manner in an eye 1' on the rod 1 (Fig. 6), and nuts 26 and 27 regulate its position.

In Fig. 7, the rod 23 is shown as fastened to the lower part of the runner-carrying rod and is united by means of an easily dismountable pivot to a piece $f$ forming a fork, which is brazed on to the usual coupling bar B. It will be observed that in this figure the runner-carrying rod is oblique, which displaces the runner inward and is sometimes advantageous.

The bracket 14 (Fig. 2) which carries the stop wheel 12 and is fixed to the axle may be of any shape and may be fixed in any manner to the axle. Figs. 8 and 9 illustrate a preferred method of constructing and fixing this bracket 14. Fig. 8 illustrates the axle seen from the front with the bracket 14 in position. Fig. 9 is a view in section taken on line 9—9 of Fig. 8.

The axle 16 shown is of I section. The bracket 14 is of U-section (Fig. 9). It is secured to the axle by means of bolts 28 and 29. The bolts 29 press against the web of the axle while the bolts 28 press against the base. It is advisable to interpose packing members 30 and 31 between the bolts 29 and the web of the axle, and between the bolts 28 and the axle base, as shown in Fig. 9. The stop wheel is fixed to the bracket in the following manner; a piece 32, of U-section (Fig. 8) is fixed to the bracket by means of rivets 17', and forms with it a sort of fork in which the wheel is mounted.

As indicated in Figs. 10 and 11, the bracket $14^2$, the arrangements of which may be varied with a view to enabling any suitable adjustment to be effected, may consist of a hollow cylindrical piece fixed to the fork of the axle, in alinement with the axis of rotation of the axle journal, by any means whatever, for instance by the pivot 15 itself, which is then longer. The nut 59 will hold the bracket $14^2$ tightly against the axle.

In the case of the application of the bracket to an axle having forks pivotally connected to its ends (Fig. 11), said bracket, which is indicated at $14^2$, will be fixed to the fork in such a manner as to swing with the fork, but the stop wheel will then be unnecessary.

The runner-carrying rod may be of any shape and cross section.

Figs. 12 and 13 relate to simplified forms of the invention. In the case of a stationary fork axle (Fig. 12) the stop jaws 11 engage the spindle 3; but in the case of a revolving-fork axle (Fig. 13), the jaws 11 engage the lower portion of the fork.

Certain motor-car wheels (and particularly those made of dished plate) are fixed by means of bolts $b$ to a plate P rigidly connected to the spindle (Fig. 16).

In order to apply the runner-carrying rod device, the head of the runner-carrying rod is enlarged and flattened as indicated in Fig. 14, and provided with holes $b'$ corresponding to the holes in the plate P for the bolts $b$. The runner-carrying rod is then fastened in position in the manner indicated in Fig. 15.

Fig. 16 illustrates a modification of the device employed for preventing the runner-carrying rod from rotating. To that end, the runner-carrying rod 1 is provided with two rods or stays $g$, $g'$, which, by means of resilient or non-resilient stretchers $h$ and $i$, are connected to the stop wheel 12'. This wheel 12' is shown behind the rod 1 in Fig. 16, and is precisely like the wheel 12, represented in Figs. 2 and 3, excepting that it is provided with two projecting lugs $j$ and $k$, to which the stretcher $h$ and $i$ are connected, the stretchers maintaining said rod in vertical position.

In the device illustrated in Fig. 17 it is the car wheel itself (without the tire, of course) that serves as a runner-carrying rod. In this construction, there is fixed to the rim a shoe I carrying an eye $m$ into which the transverse pivot pin passes. This shoe I may be fixed in any manner whatever, riveted for instance.

In Fig. 17 it will be seen that the shoe I is detachably fixed by means of collars $n$ and bolts $o$.

Rotation of the wheel is prevented by means of a fork or yoke whose two components, branches or legs 11' and 11" are fastened to a bar 10''' which is fastened to the inner face of the wheel, the stem of the fork being connected to the axle in the same manner as the bracket 14 (Fig. 1 or in some other suitable manner, illustration of this fastening being omitted as unnecessary.

In the case of cars having central-pivot steering (as indicated in Fig. 18) it will also be possible to replace the front wheels by runners in accordance with the procedure described above. The fork $t$ bears on the stop wheel $u$ fixed to the piece $v$ which is virtually integral with the axle, but it is interesting to note that in the present case the wheel $u$ does not need to be movable on its pivot since the axle rotates with the car wheel. This wheel $u$ can even be replaced by any other suitable part which is made virtually integral with the axle.

The device illustrated in Fig. 16 can also be employed.

As indicated in Fig. 19, the device can be simplified: The stop wheel 12' (Fig. 16) will no longer need to be movable on its axis, so it can be replaced by any piece whatever fixed to the axle. The rods $h$ and $i$ (Fig. 16) may even be attached to the axle itself. The same arrangement is also applicable to the rear wheels of the car, which may likewise be replaced by runners in this way.

I claim as my invention:—

1. An attachment to be substituted for an automobile wheel, comprising a rod; a runner at the foot of the rod; a universal connection between the runner and the rod; means for fastening the rod to the adjacent steering spindle; and means for maintaining the rod in a substantially vertical position and for preventing it from turning about the axis of the spindle.

2. An attachment to be substituted for an automobile wheel, comprising a runner carrier; a runner pivotally connected with said carrier to rock relatively thereto about both its transverse and its longitudinal axis; means for attaching the carrier to the adjacent steering spindle; and a stop device directly associated with said carrier for preventing it from turning about the axis of the spindle.

3. An attachment to be substituted for an automobile wheel, comprising a runner carrier; a runner pivotally connected with said carrier to rock relatively about both its transverse and its longitudinal axis; means for attaching the carrier to the adjacent steering spindle; and a stop device directly associated with said carrier for preventing it from turning about the axis of the spindle, said stop device embodying a wheel and a fork straddling the same.

4. An attachment to be substituted for an automobile wheel, comprising a rod; a runner at the foot of the rod; a universal connection between the runner and the rod; means for fastening the rod to the adjacent steering spindle; and a stop device directly associated with said rod for maintaining it in a substantially vertical position and for preventing it from turning about the axis of the spindle, said stop device embodying a wheel and a fork straddling the same.

5. An attachment to be substituted for an automobile wheel, comprising a rod; a runner at the foot of the rod; a universal connection between the runner and the rod; means for fastening the rod to the adjacent steering spindle; and a stop device for maintaining the rod in a substantially vertical position and for preventing it from turning about the axis of the spindle, said stop device embodying a wheel, a fork straddling the same, said fork and wheel constituting companion elements, and means for yieldingly connecting one of said elements to said rod, the other element being connected with the axle of the automobile.

6. An attachment to be substituted for an automobile wheel, comprising a rod having an eye at each end thereof, the upper eye being fitted over the adjacent steering spindle, a double yoke having one member fitted on the lower end of the rod, a hinge bolt passing through said yoke member and through the lower eye on said rod, a runner pivoted to the other yoke member at right angles to said bolt, and a stop device for maintaining said rod in substantially vertical position.

7. An attachment to be substituted for an automobile wheel, comprising a runner-carrying rod, means for fastening it to the adjacent steering spindle, a runner and means for securing it to said rod, and a stop device for maintaining said rod in substantially vertical position, said device embodying a yoke, and a wheel engaged by said yoke and having its center located in line with the vertical axis of the steering spindle, one of said elements being rigidly connected to the rod and the other to the axis.

8. An attachment to be substituted for an automobile wheel, comprising a runner carrier, means for fastening it to the adjacent steering spindle, a runner and means for securing it to said carrier, and a stop device for preventing the carrier from turning about the steering spindle, said device embodying a yoke, a wheel engaged by the yoke and having its center located in line with the vertical axis of the steering spindle, one of said elements being rigidly connected to the carrier and the other to the axle, and a yielding annular element interposed between said yoke and said stop wheel.

In testimony whereof I have signed this specification in the presence of two subscribing witnesses.

JOCELYN EMILE OLLIVIER.

Witnesses:
  EMILE LENDRET,
  CHAS. P. PRESSLEY.